(12) United States Patent
Taneda

(10) Patent No.: US 8,898,406 B2
(45) Date of Patent: Nov. 25, 2014

(54) DATA BLOCK READ-OUT CONTROL APPARATUS

(75) Inventor: Masahiro Taneda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 164 days.

(21) Appl. No.: 13/609,788

(22) Filed: Sep. 11, 2012

(65) Prior Publication Data
US 2013/0007383 A1    Jan. 3, 2013

Related U.S. Application Data

(63) Continuation of application No. PCT/JP2010/054141, filed on Mar. 11, 2010.

(51) Int. Cl.
- G06F 12/00 (2006.01)
- H04L 12/879 (2013.01)
- H04L 12/861 (2013.01)
- H04L 29/08 (2006.01)

(52) U.S. Cl.
CPC .......... *H04L 49/901* (2013.01); *H04L 49/9047* (2013.01); *H04L 69/324* (2013.01)
USPC ....................................... 711/159

(58) Field of Classification Search
CPC .. H04L 49/9042; H04L 49/9047; G06F 13/38
USPC .............................. 711/154, E12.001; 710/52
See application file for complete search history.

(56) References Cited

U.S. PATENT DOCUMENTS

| 5,128,931 | A | * | 7/1992 | Yamanaka et al. ............ 370/415 |
| 6,728,790 | B2 | | 4/2004 | Ennis |
| 8,699,521 | B2 | * | 4/2014 | Keels et al. .................... 370/474 |
| 2010/0054268 | A1 | * | 3/2010 | Divivier ........................ 370/412 |

FOREIGN PATENT DOCUMENTS

| JP | 2-117241 | 5/1990 |
| JP | 5-227210 | 9/1993 |
| JP | 11-298521 | 10/1999 |
| JP | 2000-286867 | 10/2000 |
| JP | 2005-518578 | 6/2005 |
| JP | 2005-210606 | 8/2005 |

OTHER PUBLICATIONS

International Search Report, mailed Apr. 6, 2010, in corresponding International Application No. PCT/JP2010/054141 (2 pp.).
English Translation of the International Preliminary Report on Patentability issued Oct. 11, 2012 in corresponding International Patent Application No. PCT/JP2010/054141.

* cited by examiner

*Primary Examiner* — Pierre-Michel Bataille
(74) *Attorney, Agent, or Firm* — Staas & Halsey LLP

(57) ABSTRACT

A data block read-out control apparatus includes: an order buffer that stores an identifier sequence in which sort-unit identifiers corresponding to data blocks stored in reception buffers prepared for each sort unit are arranged in arrival order of the data blocks; a detecting unit that detects a head position of the sort-unit identifiers in the identifier sequence; a determining unit that determines a data block to be read out from one of the reception buffers, based on at least the head position of the sort-unit identifiers and a read-out rule of data blocks from the reception buffers defined in advance; and a reading-out unit that reads out the data block determined in the determining unit, from the one of the reception buffers, wherein the sort-unit identifiers are expressed by a minimum bit number to express all sort units corresponding to the data blocks stored in the reception buffers.

13 Claims, 8 Drawing Sheets

DATA BLOCK READ-OUT CONTROL APPARATUS

CROSS-REFERENCE TO RELATED APPLICATION

This application is a continuation application of International Application PCT/JP2010/054141 filed on Mar. 11, 2010 and designated the U.S., the entire contents of which are incorporated herein by reference.

FIELD

The present invention relates to a data block read-out control apparatus.

BACKGROUND

In the related art, there is a technique of storing multiple types of arrival packets in a plurality of reception buffers for each type and reading out a packets from the plurality of reception buffers according to predetermined priority control content.

For example, in packet-based transaction, an ordering rule of packet forwarding based on a priority assigned to each packet is applied so as not to cause deadlock due to the stall of transaction. In the case of forwarding packets according to the order determined based on this rule, for example, a plurality of reception buffers provided for each packet type and a mechanism to hold/refer to the packet arrival order are prepared. The packet arrival order is prepared to forward the packets in the packet arrival order. Meanwhile, the plurality of reception buffers are prepared for inter-packet pass forwarding according to the priority. The inter-packet pass forwarding represents to forward a packet having a certain type before a packet which has another type and has been reached earlier than the packet having the certain type, according to the priority.

FIG. 9 illustrates a packet read-out control apparatus which is one of conventional techniques. The packet read-out control apparatus illustrated in FIG. 9 generates and records tags as order information indicating the arrival order for each packet, in order to hold and refer to the order information of arrival packets.

To be more specific, in the packet read-out control apparatus illustrated in FIG. 9, when reception packets reach, according to the type identifiers in the reception packets, the reception packets are respectively stored in one of a plurality of reception buffers (FIFO: First In First Out) prepared for each packet type ("A", "B" and "C" in this case).

Meanwhile, when reception packets reach, a reception trigger is generated and the type identifiers in the reception packets are input in a tag generation circuit. In the tag generation circuit, in the wake of the reception trigger, a reception order tag generation counter generates reception order tags corresponding to the type identifiers. The reception order tags are respectively stored in one of a plurality of tag buffers (FIFO) prepared for each packet type, according to the type identifiers.

An arbitration circuit reads out a tag value stored in the head of each of the plurality of tag buffers, refers to the reception order indicating each tag value, and checks the reception order (arrival order) of the packet corresponding to each tag value, namely the packet stored in the head of each reception buffer. Meanwhile, the arbitration circuit determines a packet to be read out, according to predetermined priority control content, namely an ordering rule (read-out rule) between packet types, and provides a read-out instruction to a reception buffer. Thus, the packet is read out from the corresponding reception buffer and forwarded.

Patent Document 1: Japanese National Publication of International Patent Application No. 2005-518578
Patent Document 2: Japanese Laid-Open Patent Publication No. 2-117241
Patent Document 3: Japanese Laid-Open Patent Publication No. 5-227210
Patent Document 4: Japanese Laid-Open Patent Publication No. 11-298521

However, the above conventional technique has the following problem. That is, if a tag indicating the order of each packet is generated and recorded in a tag buffer, the circuit amount of the tag buffer itself increases. For example, it is presumed that there are three reception buffers and each of these reception buffers can store 16 packets. Meanwhile, in a case where each reception buffer stores 16 packets of the maximum storage number, when the tag value generated for each packet indicates the arrival order of each packet, it is requested that the tag values represent the sum of the maximum storage numbers of the reception buffers, that is, values of 48 (16×3=48) patterns. In this case, the minimum bit number to indicate the tag values of 48 patterns is six bits.

Therefore, the minimum capacity for the tag buffers is 288 bits (6 (tag value)×16 (packet maximum storage number)×3 (reception buffer number)=288 [bit]).

SUMMARY

According to an aspect of the embodiment, the embodiment is a data block read-out control apparatus. The data block read-out control apparatus includes:
an order buffer that stores an identifier sequence in which sort-unit identifiers corresponding to a plurality of data blocks stored in a plurality of reception buffers prepared for each sort unit are arranged in arrival order of the plurality of data blocks;
a detecting unit that detects a head position of each of the sort-unit identifiers in the identifier sequence;
a determining unit that determines a data block to be read out from one of the plurality of reception buffers, based on at least the head position of each of the sort-unit identifiers and a read-out rule of data blocks from the plurality of reception buffers defined in advance; and
a reading-out unit that reads out the data block determined in the determining unit, from the one of the plurality of reception buffers,
wherein the sort-unit identifiers are expressed by a minimum bit number to express all sort units corresponding to the data blocks stored in the plurality of reception buffers.

The object and advantages of the invention will be realized and attained by means of the elements and combinations particularly pointed out in the claims.

It is to be understood that both the foregoing general description
and the following detailed description are exemplary and explanatory and
are not restrictive of the invention.

DESCRIPTION OF EMBODIMENTS

In the following, embodiments of the present invention will be explained with reference to the drawings. Configurations in the following embodiments are just examples and the present invention is not limited to the configurations in the embodiments.

<Embodiment 1>

Figure 1:
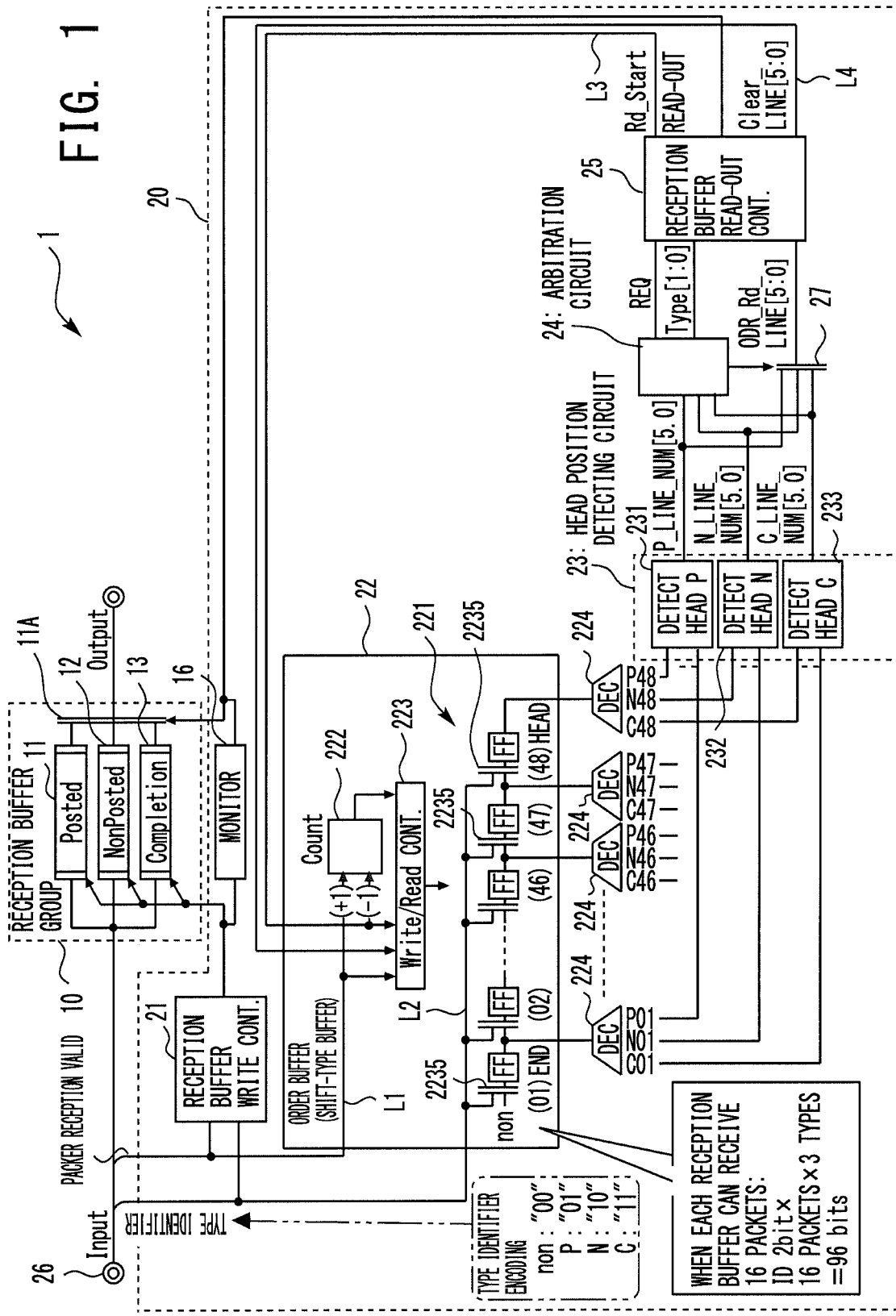
FIG. 1 is a diagram illustrating a configuration example of a data block read-out control apparatus in Embodiment 1.

FIG. 1 is a diagram illustrating a configuration example of a data block read-out control apparatus in the Embodiment 1. As a data block read-out apparatus, Embodiment 1 will describe a packet read-out apparatus to control a transmission order between sort units of packets as data blocks. In the example in Embodiment 1, a packet read-out apparatus 1 controls the transmission order of three packet types of type "P," type "N" and type "C" as a plurality of packet types which are an example of the sort units.

The type "P" as a first packet type is "posted" including a request of processing for which a reply of a completion report is not requested. The type "N" as a second packet type is "non-posted" including a request of processing for which a reply of a completion report is requested. The type "C" as a third packet type is "completion" including a completion report of processing. In the following, it is simply expressed as "packet" in a case where an explanation is given without distinguishing packet types, and, in a case where packet types have to be identified, a packet of the type "P" (i.e. "posted") is expressed as "P packet," a packet of the type "N" (i.e. "non-posted") is expressed as "N packet" and a packet of the type "C" (i.e. completion) is expressed as "C packet."

The packet read-out apparatus 1 is provided with channels (transmission paths) to forward packets of the types "P," "N" and "C." A packet-forwarding ordering rule (read-out rule) between packets is applied to a packet of each of the types flown in the channels. In the example in Embodiment 1, the forwarding priority order of "P," "C" and "N" is determined in advance and packets are forwarded according to the priority order.

In FIG. 1, the packet read-out apparatus 1 includes a reception buffer group 10 and a packet read-out control apparatus 20.

The reception buffer group 10 includes a plurality of reception buffers prepared for each packet type as a sort unit. Here, the reception buffer group 10 includes reception buffers 11, 12 and 13 corresponding to the packets types "P," "N" and "C." Each of the reception buffers 11, 12 and 13 are FIFOs, each of which is able to store 16 packets, as the maximum number, each having a fixed-length or a variable-length.

The packet read-out control apparatus 20 includes a reception buffer write control circuit 21 as a packet write control unit, an order buffer 22 as an ordering buffer, a head position detection circuit 23 as a detecting unit, an arbitration circuit 24 as a determining unit and a reception buffer read-out control circuit 25 as a packet read-out control unit.

In FIG. 1, a reception unit (receiver) 26 of the packet read-out apparatus 1 receives packets which have reached one by one. The reception unit 26 is connected to a reception buffer group 10, a reception buffer write control circuit 21 and an order buffer 22.

The packets received in the reception unit 26 are input to the reception buffer group 10, and the packets are sorted and stored in any one of the reception buffers 11, 12 and 13 according to the packet types as sort units. The reception buffer 11 stores P packets. The reception buffer 12 stores N packets. The reception buffer 13 stores C packets.

Also, a monitoring unit (monitor) 16 is provided to monitor accumulation amounts of the reception buffers 11 to 13 of the reception buffer group 10. In the monitoring unit 16. A packet write instruction output from the reception buffer write control circuit and a reception buffer read-out instruction output from the reception buffer read-out control circuit 25 are input to the monitoring unit 16. The monitoring unit 16 includes a counter (having an initial value of "0") prepared for each of the plurality of reception buffers (reception buffers 11 to 13) forming the reception buffer group 10. When a write instruction is input from the reception buffer write control circuit 21, the monitoring unit 16 specifies a reception buffer for which packet writing is designated by the write instruction, and adds "1" to a value of the counter corresponding to the reception buffer. Meanwhile, when a reception buffer read-out instruction is input from the reception buffer read-out control circuit 25, the monitoring unit 16 specifies a reception buffer for which the packet readout is designated by the reception buffer read-out instruction, and subtracts "1" from a value of the counter corresponding to the reception buffer. Type identifiers in packets encoded by an encoder (not shown) included in the reception unit 26 are input to the reception buffer write control circuit 21 and the order buffer 22.

The type identifier denotes information indicating a packet type and is expressed by a bit number to express sort units of packets stored in the multiple reception buffers 11 to 13, that is, all packet types of the packets stored in the reception buffers 11 to 13. In the present embodiment, there are three types of "P," "N" and "C" as the packet types, and therefore the type identifiers are expressed by 2 bits. To be more specific, a bit value of "01" is assigned to P packets, a bit value of "10" is assigned to N packets and "11" is assigned to C packets. A bit value of "00" is treated as "non" indicating that a packet type is unassigned.

Also, a packet reception valid signal (Pkt_Rcv_Val) indicating that the packet reception at the reception unit 26 is "valid" is input to the reception buffer write control circuit 21 and the order buffer 22. The packet reception valid signal is used as a reception trigger at the reception buffer write control circuit 21 and the order buffer 22.

The reception buffer write control circuit 21 receives a type identifier of a received packet and the packet reception valid signal. The reception buffer write control circuit 21 refers to content of the type identifier by using the packet reception valid signal as a trigger, and provides a packet write instruction to a reception buffer corresponding to the type identifier to the reception buffer group 10.

The reception buffer group 10 stores the packet input from the reception unit 26 in the reception buffer corresponding to the type identifier, in response to the packet write instruction from the reception buffer write control circuit 21. In this way, the packet received in the reception unit 26 is sorted into one of the reception buffers 11 to 13 according to the type identifier.

The order buffer 22 is a shift-type buffer having a plurality of stages. The order buffer 22 includes an FF group 221 including flip flops ("FFs") as storage areas forming the plurality of stages connected in serial, a counter (Count) 222 and a write/read control unit 223.

The FF group 221 includes FFs corresponding to the maximum packet storage number in the reception buffer group 10. In this example, 48 flip flops FF_01 to FF_48 equal to the maximum packet storage number of "48" in the reception buffer group 10 are connected in serial. In FIG. 1, FF_48 is provided in the head and FF_01 is provided in the tail end.

To be more specific, the input side of each FF is connected to a selector 2235, and one of input terminals of the selector 2235 is connected to a signal line L2 in which type identifiers from the reception unit 26 are flown. Also, the other input terminal of the selector 2235 is connected to an output terminal of an FF on the next stage. However, it is designed that "non" indicating unassignment is input in one input terminal of the selector 2235 provided on the input side of FF_01 positioned on the last stage.

Thus, in the input terminal of each FF, a type identifier ("P," "N" or "C") from the signal line L2 or holding content ("P," "N," "C" or "non," where only "non" is applied in the case of FF_01) of an FF on the next stage is input.

The write/read control unit 223, by controlling the operation of each selector 2235, is able to store type identifiers of valid packets which have arrived at the packet read-out apparatus 1, into the FF group 221 in order of arrival (or reception) of the packets. Also, the write/read control unit 223 is able to delete type identifiers of packets read from the reception buffer group 10, from the FF group 221 through the operation control of the selectors 2235. Therefore, the FF group 221 is able to hold the type identifier of each packet stored in the reception buffer group 10, in order of arrival (or reception). Further, the write/read control unit 223 stores the type identifiers of the packets stored in the reception buffer group 10, in the FF group 221 in a forward aligned manner. A specific configuration of the write/read control unit 223 will be described later.

Figure 2:
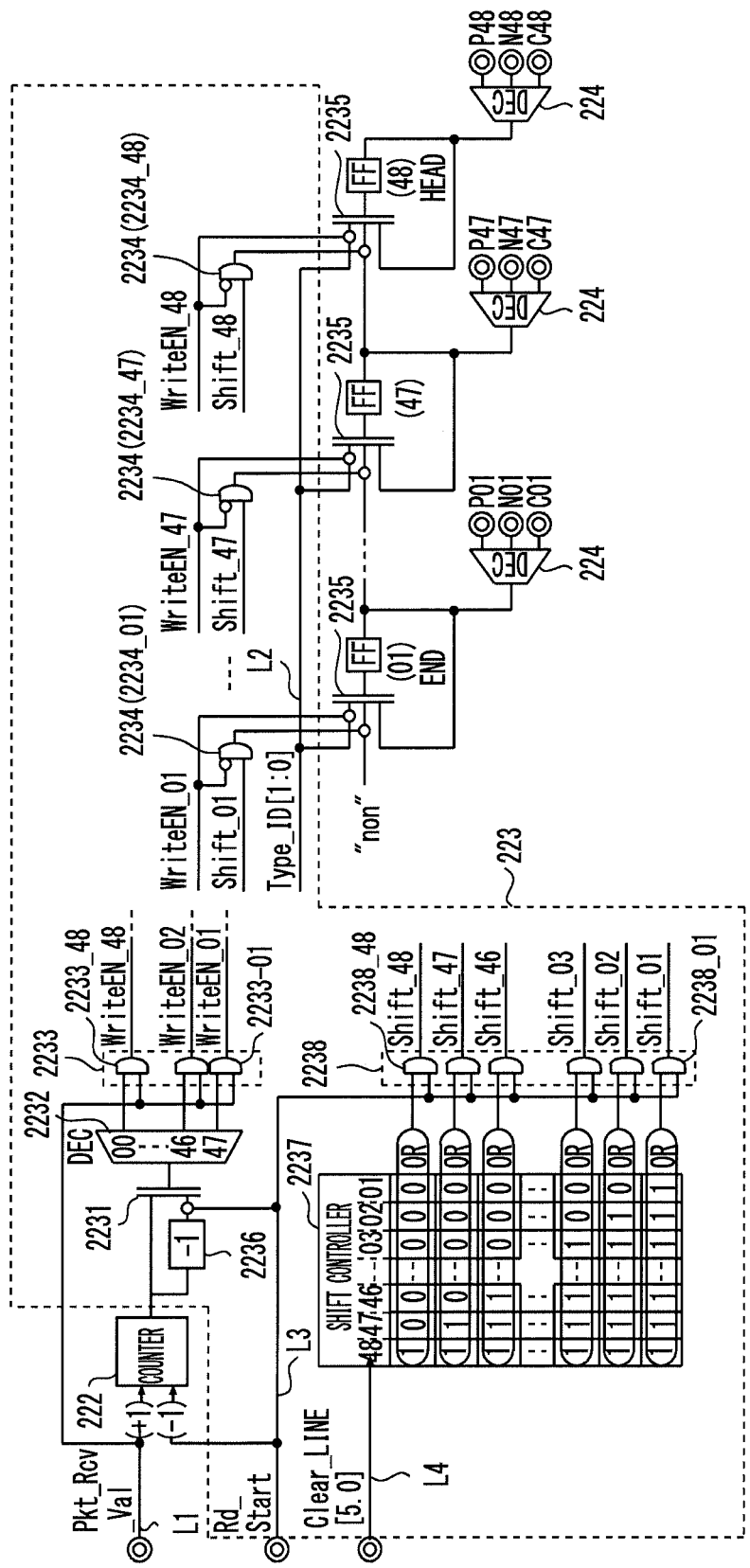
FIG. 2 is a diagram illustrating an example of detailed configuration of an order buffer illustrated in FIG. 1.

FIG. 2 is a diagram illustrating a specific configuration example of the order buffer 22 illustrated in FIG. 1. In FIG. 2, the counter 222 has a counter value indicating the number of type identifiers stored in the FF group 221, that is, the number of packets held in the reception buffer group (here, initial value of "00"). Also, the counter value is used to designate a write position of a type identifier with respect to the FF group 221.

The packet reception valid signal (Pkt_Rcv_Val) indicating that a valid packet is received in the reception unit 26 and a packet read start signal (Rd_Start) from the reception buffer read-out control circuit 25 are input to the counter 222. The packet read start signal (Rd_Start) denotes a signal instructing that packets from the reception buffer group 10 start to be read.

The counter 222 uses input of a packet reception valid signal (Pkt_Rcv_Val) as a trigger and adds "1" to the counter value. Meanwhile, the counter 222 uses input of a packet read start signal (Rd_Start) as a trigger and subtracts "1" from the counter value. Therefore, the counter value denotes the number of type identifiers stored in the FF group 221, that is, the number of packets held by the reception buffer group 10.

The above packet reception valid signal (Pkt_Rcv_Val), the packet read start signal (Rd_Start), the counter value of the counter 222 and a clear-line position signal (Clear_LINE) from the reception buffer read-out control circuit 25 are input to the write/read control unit 223. The clear-line position signal includes values ("01" to "48") designating FFs holding the type identifiers of packets read from the reception buffer group 10.

The packet reception valid signal flows in the signal line L1 connected to the reception unit 26. A type identifier (Type_ID) from the reception unit 26 flows in the signal line L2. The packet read start signal (Rd_Start) from the reception buffer read-out control circuit 25 flows in a signal line L3. The clear line position signal (Clear_LINE) from the reception buffer read-out control circuit 25 flows in a signal line L4.

The write/read control unit 223 includes a selector 2231, a decoder 2232, AND circuits 2233 corresponding to the number of stages of the FF group 221 (i.e. the number of FFs or 48 in the example of Embodiment 1), AND circuits 2234 corresponding to the number of stages of the FF group 221, a subtractor 2236, a shift control unit 2237 and AND circuits 2238 corresponding to the number of stages of the FF group 221.

The signal line L1, in which the packet reception valid signal flows, is connected to one input terminal of each AND circuit 2233. Also, the signal line L1 is connected to the counter 222, and, in the wake of reception of the packet reception valid signal (Pkt_Rcv_Val), the counter 222 adds "1" to the counter value held in the counter 222.

An output terminal of the counter 222 is connected to the selector 2231 and the subtractor 2236. The subtractor 2236 subtracts "1" from the counter value of the counter 222. The subtractor 2236 is connected to the selector 2231.

The selector 2231 outputs one of the counter value of the counter 222 and a value acquired by subtracting "1" from the counter value in the subtractor 2236, to the decoder 2232. In a case where the packet read start signal (Rd_Start) flown in the signal line L3 is not input, the selector 2231 selects a counter value from the counter 222 and inputs it in the decoder 2232. By contrast with this, when the packet read start signal is input in the signal line L3, the selector 2231 uses the input packet read start signal as a selection condition and outputs the output from the subtractor 2236 to the decoder 2232. Operations of the selector 2231 will be described later.

It should be noted that the signal line L3 is connected to the counter 222, and, in the wake of reception of the packet read start signal (Rd_Start), the counter 222 subtracts "1" from the counter value held in the counter 222.

The decoder 2232 has a plurality of output terminals connected to one input terminal of each of the AND circuits 2233. The decoder 2232 outputs an ON signal from an output terminal corresponding to the counter value input from the selector 2231 or the subtraction value of the counter value, and outputs an OFF signal from the other output terminal. The AND circuits 2233 are associated with FF_48 to FF_01 forming the FF group 221. For example, in a case where a counter value of "0" is input in the decoder, an ON signal is given only to the AND circuit 2233_48 corresponding to FF_48 and an OFF signal is given to the remaining AND circuits 2233.

Each AND circuit 2233 outputs an ON signal on conditions that an input into both input terminals held by the AND circuit 2233 is turned on. The ON signal functions as a write enable signal (WriteEN_X ($01 \leq X \leq 48$)) of a type identifier with respect to an FF corresponding to the AND circuit 2233. The write enable signal is used as a selection condition of the type identifier (Type_ID) flown in the signal line L2, with respect to the selector 2235 provided on the input side of each FF forming the FF group 221.

Each selector 2235 provided on the input sides of FF_48 to FF_02 is connected to an FF on the next stage via the signal line. Meanwhile, in the selector 2235 provided on the input side of FF_01, "non" ("00") indicating unassignment is input. By this means, each selector 2235 selects one of the type identifier flown in the signal line L2 and the holding content of the FF on the next stage ("non" in the case of the selector 2235 corresponding to FF_01) and outputs the result to an FF on the head side.

Also, it is designed that, in the selector 2235, an output signal of an FF positioned on the subsequent stage is input.

Selection conditions, on which each selector 2235 selects one of the holding content of an FF on the next stage and "non," are realized by a circuit configuration described below. That is, the signal line L3, in which the packet read start signal (Rd_Start) flows, is connected to one input terminal of each AND circuit 2238.

The clear-line position signal (Clear_LINE) flown in the signal line L4 is input in the shift control unit 2237. The shift control unit 2237 is connected to one input terminal of each AND circuit 2238 and controls an output of an ON signal with respect to each AND circuit 2238, according to the clear line positions ("01" to "48"). The multiple AND circuits 2238 are formed with AND circuits corresponding to the number of FF stages forming the FF group 221, and are associated with FFs respectively.

In the example of Embodiment 1, according to a clear-line position, the shift control unit 2237 performs operations of: inputting an ON signal in an FF on the clear-line position and the AND circuit 2238 corresponding to an FF on a stage subsequent to the clear-line position; and, if there is the AND circuit 2238 corresponding to an FF before the clear line, inputting an OFF signal to the AND circuit 2238.

For example, in a case where the line-clear position is "48," the shift control unit 2237 outputs ON signals to all of the AND circuits 2238. In a case where the line-clear position is "47," the shift control unit 2237 inputs an OFF signal in the AND circuit 2238 (2238_48) corresponding to FF_48 positioned before the line-clear position, and inputs ON signals in the remaining AND circuits 2238. The same operation applies to the other line-clear positions "46" to "01." In a case where the line-clear position is "01" in the tail end, the shift control unit 2237 inputs an ON signal in the AND circuit 2238 corresponding to FF_01 and inputs OFF signals in the remaining AND circuits 2238.

In each AND circuit 2238, in a case where the packet read start signal (Rd_Start) is input and an ON signal is input from the shift control unit 2237, an ON signal is output. The ON signal of the AND circuit 2238 functions as a shift order signal (Shift_X (01≤X≤48)).

The output terminal of each AND circuit 2238 is connected to each of one input terminals of the multiple AND circuits 2234 corresponding to the FFs forming the FF group 221. In the other input terminal of each AND circuit 2234, an inversion signal of a write enable signal (WriteEN_X) output from the AND circuit 2233 corresponding to the same FF is input. Therefore, in a case where the write enable signal is "OFF" and the shift order signal is "ON," each AND circuit 2234 outputs an ON signal.

The ON signal output from the AND circuit 2234 is used as a selection condition for the holding content of an FF on the next stage or "non," with respect to the selector 2235 positioned on the input side of an FF corresponding to the AND circuit 2234.

Therefore, in each FF_48 to FF_01, when the write enable signal is output from the corresponding AND circuit 2233 while the AND circuit 2234 is "OFF," a type identifier flown in the signal line L2 is written in the FF. By contrast with this, when the AND circuit 2233 corresponding to the FF is "OFF" (i.e. without the write enable signal) and the corresponding AND circuit 2234 is "ON," the holding content of an FF on the next stage or "non" is written in that FF.

The write/read control unit 223 described above performs operations as follows. Immediately after the initial reset of the order buffer 22, it becomes an initialization state in which all of FF_48 to FF_01 of the FF group 221 hold "non." Also, in the initialization state, a counter value is set as "00." At this time, it becomes a state where an ON signal is input in the AND circuit 2233_48 corresponding to FF_48 in response to the counter value "00" and an OFF signal is input in the remaining AND circuits 2233.

In such a state, it is presumed that the packet reception valid signal and the type identifier are output from the reception unit 26. Then, the AND circuit 2238_48 is turned on by the packet reception valid signal flown in the signal line L1 and the write enable signal (WriteEN_48) is output from the AND circuit 2233_48. At this timing, a packet read start signal and a line-clear position with respect to the signal lines L3 and L4 are "OFF" (i.e. no input), the AND circuit 2234_48 corresponding to FF_48 is turned off. Therefore, the selector 2235 corresponding to FF_48 selects a type identifier flown in the signal line L2 and inputs it in FF_48. By this means, FF_48 holds the type identifier.

Meanwhile, the counter 222 adds "1" to the counter value "00" in response to an input of the packet reception valid signal. Therefore, it becomes a state where the counter value becomes "01" and the decoder 2232 inputs an ON signal only in the AND circuit 2233 (2233_47) corresponding to FF_47 and OFF signals are input in the remaining AND circuits 2233.

After that, it is presumed that a packet reception valid signal and a type identifier from the reception unit 26 are input in the signal line L1 and the signal line L2, respectively. Then, by the packet reception valid signal, the AND circuit 2233_47 is turned on and the write enable signal (WriteEN_47) is output. At this timing, a packet read start signal and a line-clear position with respect to the signal lines L3 and L4 are "OFF" (i.e. no input), and therefore the AND circuit 2234_47 corresponding to FF_47 is "OFF." Therefore, the selector 2235 corresponding to FF_47 selects a type identifier flown in the signal line L2 and inputs it in FF_47. In FF_48 and FF_46 to FF_01, a write enable signal and an output of the AND circuit 2234 are both "OFF," and therefore the holding content is kept maintained. By this means, it becomes a state where FF_48 and FF_47 hold type identifiers.

Meanwhile, the counter 222 adds "1" to the counter value "01" in response to an input of the packet reception valid signal. Therefore, the counter value becomes "02."

After that, it is presumed that, with respect to a packet having the type identifier held in FF_48, the packet read start signal (Rd_Start) from the reception buffer group 10 is input from the reception buffer read-out control circuit 25 to the signal line L3, and, next, the line-clear position "48" to delete the holding content of FF_48 is input from the reception buffer read-out control circuit 25 to the signal line L3.

In this case, by the packet read start signal and an output of the shift control unit 2237 in response to the clear-line position "48," all the AND circuits 2238 are turned on and the shift order signal (Shift_X) is output. At this timing, the write enable signal from each AND circuit 2233 is "OFF," and therefore all the AND circuits 2234 are turned on. Then, the selectors 2235 corresponding to FF_48 to FF_02 select the holding content of FFs on the next stages and cause the corresponding FFs to hold them. Therefore, the holding content of FF_47 to FF_01 shifts in a forward aligned manner and the holding content of FF_48 is deleted. Also, the selector 2235 corresponding to FF_01 causes FF_01 to hold "non."

After that, for example, it is presumed that a packet read start signal for a packet having a type identifier held in FF_48 and a line-clear position are input in the signal lines L3 and L4, while the packet reception valid signal and the type identifier are input in the signal lines L1 and L2.

In this case, the holding content of above FF_47 to FF_01 shifts in a forward aligned manner and the holding content of FF_48 is deleted. At this time, although the counter value of the counter 222 is "01," when a type identifier is written in a position corresponding to the counter value "01," the type identifier is written in FF_47 despite that FF_48 is available. Therefore, during a time period the packet read start signal is input, the selector 2231 selects a subtraction value from the subtractor 2236, that is, a subtraction value "00" acquired by subtracting "1" from the counter value "01," and inputs it in the decoder 2232. By this means, a write enable signal (WriteEN_48) for a type identifier with respect to FF_48 is caused and the type identifier is written in FF_48. Meanwhile, the counter value of the counter 222 is subtracted by "1" by the packet read start signal (i.e. from "01" to "00") but gets in a state where it is added by "1" by the packet reception valid signal (i.e. from "00" to "01").

As described above, by storing a plurality of type identifiers in the FF group 221 in order of arrival of the packets into the packet read-out apparatus 1, the FF group 221 holds an identifier sequence in which the type identifiers corresponding to a plurality of packets stored in the reception buffer group 10 are arranged in order of arrival. That is, the type identifiers corresponding to the received packets are held from the head to the tail end of the FF group 221 in order from the oldest reception time. By this means, an identifier positioned closer to the head side of the FF group 221 indicates a packet of older arrival order.

Also, the write/read control unit 223 stores type identifiers in the FF group 221 in a forward aligned manner. That is, the write/read control unit 223 refers to the counter value from the counter 222 at the time of writing a type identifier and writes a type identifier transferred from the reception unit 26 in a position corresponding to the counter value or subtraction value.

By this means, a plurality of type identifiers corresponding to reception packets are continuously stored in a subsequent FF group in which FF_48 is the head. Thus, by storing an identifier sequence in the FF group 221 in a forward aligned manner, stage positions of FFs holding type identifiers show an arrival order of packets.

In a case where a certain packet is read from the reception buffer group 10, in response to a packet read start signal and clear-line position from the reception buffer read-out control circuit 25, the write/read control unit 223 deletes a type identifier corresponding to the packet read from the reception buffer group 10, from an FF holding the type identifier, and shifts the type identifier held in each FF between a position immediately after a position in which the virtual channel identifier is deleted and the tail end position, one by one to the head side. By this means, when deleting a type identifier from an FF, the write/read control unit 223 performs write control of type identifiers so as to shift holding content of subsequent FFs and maintain a forward-aligned state.

In the following, the head position detection circuit 23, the arbitration circuit 24 and the reception buffer read-out control circuit 25, which are components to determine a packet to be read from the reception buffer group 10, will be explained in detail.

The head position detection circuit 23 includes a head P position detection circuit 231, a head N position detection circuit 232 and a head C position detection circuit 233. The output terminal of each FF included in the FF group 221 is connected to a decoder 224 to decode the type identifier held in each FF. The decoder 224 has three output lines (i.e. P line, N line and C line) corresponding to P, N and C. Each P line (P01 line to P48 line) is connected to the head P position detection circuit 231, each N line (N01 line to N48 line) is connected to the head N position detection circuit 232 ad each C line (C01 line to C48 line) is connected to the head C position detection circuit 233.

The decoder 224 decodes holding content of a corresponding FF and, when the decode result is "P," outputs an ON signal only to the P line and outputs an OFF signal to the remaining N line and C line. Also, when the decode result is "N," the decoder 224 outputs an ON signal only to the N line and outputs an OFF signal to the remaining P line and C line. Also, when the decode result is "C," the decoder 224 outputs an ON signal only to the C line and outputs an OFF signal to the remaining P line and N line. Also, when the holding content of the FF is "non," the decoder 224 outputs an OFF signal to all of the P line, the N line and the C line.

For example, the decoder 224 connected to FF_48 has the P line (i.e. P48 line), the N line (i.e. N48 line) and the C line (i.e. C48 line) supporting FF48. The P48 line is connected to the head P position detection circuit 231, the N48 line is connected to the head N position detection circuit 232 and the C48 line is connected to the head C position detection circuit 233.

In a case where a type identifier held in FF_48 is "P," the decoder 224 connected to FF_48 sets the P48 line to be "ON" (i.e. outputs an ON signal) and sets the remaining N48 line and C48 line to be "OFF" (i.e. outputs an OFF signal). Also, in a case where the type identifier held in FF_48 is "N," the decoder 224 sets the N48 line to be "ON" and sets the remaining P48 line and C48 line to be "OFF." Furthermore, in a case where the type identifier held in FF_48 is "C," the decoder 224 sets the C48 line to be "ON" and sets the remaining P48 line and N48 line to be "OFF." Such operations are performed in decoders 224 connected to other FF_47 to FF_01. Here, in a case where the holding content of an FF is "non," the decoder 224 sets all output lines to be "OFF."

Figure 3:
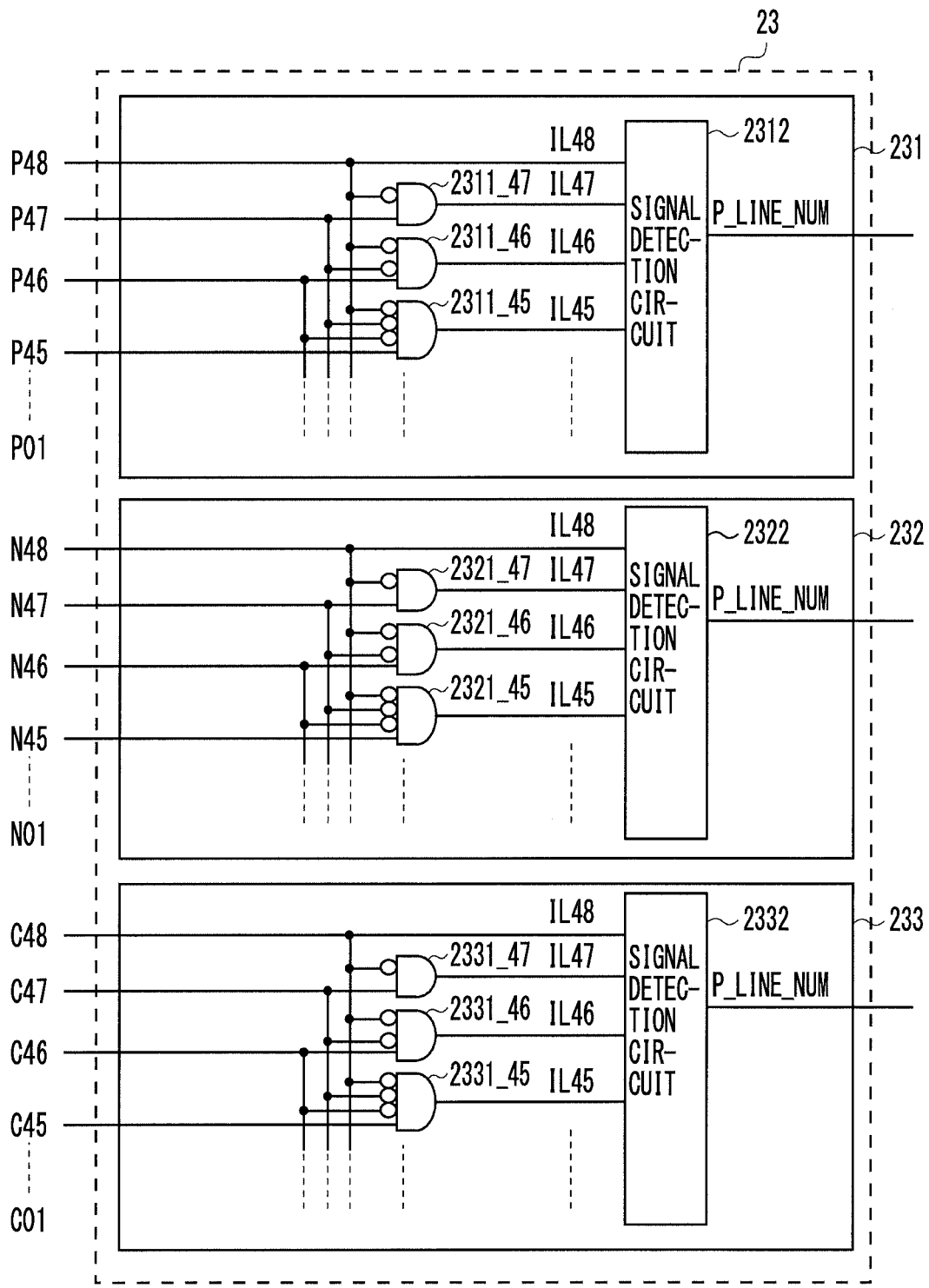
FIG. 3 is a diagram illustrating an example of detailed configuration of a head position detection circuit illustrated in FIG. 1.

FIG. 3 illustrates a configuration example of the head position detection circuit 23. As the head P position detection circuit 231, the head N position detection circuit 232 and the head C position detection circuit 233, for example, it is possible to apply a priority encoder. Since the head P position detection circuit 231, the head N position detection circuit 232 and the head C position detection circuit 233 have substantially the same configurations, the head P position detection circuit 231 will be explained as an example.

In the example illustrated in FIG. 3, as a priority encoder, the head P position detection circuit 231 has N items (N=47 in the example of Embodiment 1) of AND circuits 2311_47 to 2311_01 (however, only 2311_47 to 2311_45 are illustrated in FIG. 3) corresponding to the P47 line to the P01 line (FF_47 to FF_01), and a signal detection circuit 2312. In the following, it is simply expressed as "AND circuit 2311" in a case where an explanation is given without distinguishing the AND circuits 2311_47 to 2311_01.

The P48 line is directly connected to the signal detection circuit 2312. The remaining P47 to P01 lines are connected to input terminals of the corresponding AND circuits 2311_47 to 2311_01, respectively. Also, an ON/OFF signal flown in a P line is input in an inverting input terminal held by each of the AND circuits 2311 corresponding to line numbers smaller than the line number of the P line.

For example, an ON/OFF signal flown in the P48 line is input in the inverting input terminals held by the AND circuits 2311_47 to 2311_01 corresponding to the P47 to P01 lines. An ON/OFF signal flown in the P47 line is connected to the inverting input terminals held by the AND circuits 2311_46 to 2311_01 corresponding to the P46 to P01 lines. Thus, each AND circuit 2311 includes one or more inverting input terminals to accept an input of an inversion signal of the ON/OFF signal from each P line having a larger line number than the corresponding P line number. Therefore, only in a case where an ON signal from the corresponding P line is input and an OFF signal is input in all inverting input terminals held by the AND circuits 2311, each AND circuit 2311 outputs an ON signal. In other words, only in a case where an FF corresponding to the AND circuit 2311 is the head FF holding a type identifier "P," each AND circuit 2311 is in an "ON" state.

As described above, the P48 line is connected to the signal detection circuit. Also, the output terminals of the AND circuits 2311_47 to 2311_01 are connected to the signal detection circuit 2312 via signal lines. Here, a plurality of signal lines connecting between the P48 line, the AND circuits 2311_47 to 2311_01 and the signal detection circuit, will be referred to as "input lines 48 to 01 (IL48 to IL01)" for explanation.

In the signal detection circuit 2312, ON/OFF (0/1) of the input lines IL48 to IL01 can be recognized as a 48-bit bit sequence in which the input lines IL48 to IL01 are arranged in order from the largest number. By means of circuit configurations of the above AND circuits 2311_47 to 2311_01, only one of the input lines IL48 to IL01 is turned on and the other input lines are turned off. Therefore, the signal detection circuit 2312 detects a bit position of ON ("1") from the 48-bit bit sequence in which the input line IL48 is the head, and outputs the detected position as a P line number (P_LINE_NUM) corresponding to a headmost FF holding a type identifier "P" in the FF group 221.

The head N position detection circuit 232 has substantially the same configuration as that of the head P position detection circuit 231, except for that the P line in the head P position detection circuit 231 is replaced with the N line. That is, it has AND circuits 2321_47 to 2321_01 corresponding to the AND circuits 2311_47 to 2311_01, and a signal detection circuit 2322 corresponding to the signal detection circuit 2312. The signal detection circuit 2322 performs similar processing to that in the signal detection circuit 2312, and outputs an N line number (N_LINE_NUM) corresponding to a headmost FF holding a type identifier "N" in the FF group 221.

Similarly, the head C position detection circuit 233 has substantially the same configuration as that of the head P position detection circuit 231, except for that the P line in the head P position detection circuit 231 is replaced with the C line. That is, it has AND circuits 2331_47 to 2331_01 corresponding to the AND circuits 2311_47 to 2311_01, and a signal detection circuit 2332 corresponding to the signal detection circuit 2312. The signal detection circuit 2332 performs similar processing to that in the signal detection circuit 2312, and outputs a C line number (C_LINE_NUM) corresponding to a headmost FF holding a type identifier "C" in the FF group 221.

As described above, the head P position detection circuit 231, the head N position detection circuit 232 and the head C position detection circuit 233 detect the headmost output line numbers among output lines in which the output is in an ON state, that is, stage positions of the headmost FFs as the head positions of the P packet, the N packet and the C packet.

Figure 4:
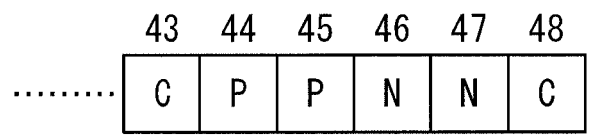
FIG. 4 illustrates an example of the head position detection operation of each identifier.

FIG. 4 illustrates an example of the head position detection operation of each identifier. For example, as illustrated in FIG. 4, it is presumed that, in FF_48 to FF_43, a plurality of type identifiers are held in order from "C," "N," "N," "P," "P" and "C."

In this case, the head P position detection circuit 231 detects the P line number "45" corresponding to headmost FF48 holding the type identifier "P." Similarly, the head N position detection circuit 232 detects the N line number "47" corresponding to headmost FF47 holding the type identifier "N," and the head C position detection circuit 233 detects the C line number "48" corresponding to headmost FF48 holding the type identifier "C." Thus, the head position detection circuit 23 detects positions of packets of the latest arrival time in the FF group 221 for the packet types P, N and C, that is, the head positions of the P packet, the N packet and the C packet.

The head P position detection circuit 231 outputs the P_LINE_NUM signal indicating the P line number of the head position of the virtual channel identifier "P." The head N position detection circuit 232 outputs the N_LINE_NUM signal indicating the N line number of the head position of the virtual channel identifier "N." The head C position detection circuit 233 outputs the C_LINE_NUM signal indicating the C line number of the head position of the virtual channel identifier "C." In a case where there is no line to be output, that is, in a case where there is no packet to be read out, each of the detecting units 231, 232 and 233 outputs "0."

The arbitration circuit 24 accepts an input of the output signals from the head position detection circuit 23, that is, the P_LINE_NUM signal, the N_LINE_NUM signal and the C_LINE_NUM signal. In the arbitration circuit 24, by the output signals (i.e. the P_LINE_NUM signal, the N_LINE_NUM signal and the C_LINE_NUM signal) received from the head P position detection circuit 231, the head N position detection circuit 232 and the head C position detection circuit 233, it is possible to find whether there is each of packets P, N and C, and the arrival order in each of the packet types P, N and C. In the arbitration circuit 24, further, taking into account the forward ordering rule between packet types, arbitration processing is performed to determine a packet to be read out from the reception buffer group 10, that is, a reception buffer for which packet reading has to be performed.

In the present embodiment, the arbitration circuit 24 recognizes the arrival order of P, C and N, and, according to the forward ordering rule, determines a packet type of a packet to be read (i.e. reception buffer for which packet reading has to be performed) in the preference order of P, C and N. Here, as the forward ordering rule used in arbitration processing, in addition to or instead of the above preference order, a rule of other conditions may be used. That is, the arbitration rule used in the arbitration circuit 24 can be adequately set using one or more conditions.

When determining a reception buffer for which a packet is read out, the arbitration circuit 24 outputs a packet read-out request (REQ) and a signal (Type) indicating a packet type of a read-out target to the reception buffer read-out control circuit 25.

Here, the output signals (i.e. the P_LINE_NUM signal, the N_LINE_NUM signal and the C_LINE_NUM signal) output from the head P position detection circuit 231, the head N position detection circuit 232 and the head C position detection circuit 233 are input not only in the arbitration circuit 24 but also in the selector 27 subjected to output control by the arbitration circuit 24.

When determining a reception buffer for which packet reading has to be performed by arbitration processing, the arbitration circuit 24 gives to the selector 27 a control signal to instruct to select an output signal (i.e. one of the P_LINE_NUM signal, the N_LINE_NUM signal and the C_LINE_signal) corresponding to the determined reception buffer. The selector 27 selects the output signal according to the control signal and outputs the selected output signal to the reception buffer read-out control circuit 25 as a line number (storage position: ODR_Rd_LINE) of a type identifier corresponding to the read-out target packet. By this means, the line number (ODR_Rd_LINE) corresponding to the FF storing the type identifier of the packet determined to be read, is input in the reception buffer read-out control circuit 25.

The reception buffer read-out control circuit 25 controls the reception buffer read-out start timing. When receiving the packet read-out request (REQ) from the arbitration circuit 24, the reception buffer read-out control circuit 25 specifies a reception buffer (one of 11 to 13) corresponding to the packet type, which is indicated by the signal (Type) indicating the packet type output from the arbitration circuit and which is designated by the arbitration circuit 24, and issues a reception buffer read-out instruction with respect to the specified reception buffer.

The reception buffer read-out instruction output by the reception buffer read-out control circuit 25 is input in a read-out circuit (i.e. selector 11A) of the reception buffer group 10, and a packet from the reception buffer corresponding to the reception buffer read-out instruction is selected by the selector 11A and output toward the transmission destination.

The reception buffer read-out control circuit 25 outputs a packet read-out start signal (Rd_Start) together with an output of the read-out instruction. As described above, the packet read-out start signal (Rd_Start) is input in the counter 222 and the write/read control unit 223 of the order buffer 22 via the signal line L3. Also, the reception buffer read-out control circuit 25 outputs a clear line position (Clear_LINE) of the holding content of an FF holding a type identifier corresponding to the read-out target packet, together with the packet read-out start signal (Rd_Start). The clear-line position is input in the write/read control unit 223 of the order buffer 22 via the signal line L4. By this means, the write/read control unit 223 performs operations when accepting an input of the packet read-out start signal and the clear-line position as described above, and, by shifting type identifiers held by FFs in stages subsequent to an FF corresponding to the clear-line position or "non" one by one to the head side, a type identifier held by the FF on the clear-line position is deleted. Also, "non" is written in FF_01 of the tail end.

Figure 5:
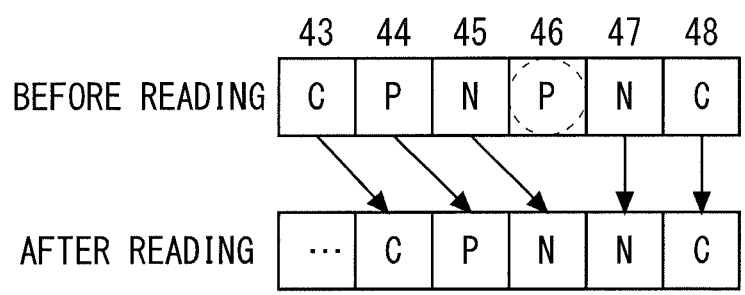
FIG. 5 illustrates an operation of a clearing operation of an order buffer (FF group).

FIG. 5 illustrates an example of a clearing operation of the order buffer (i.e. FF group 221). For example, before packets are read out, it is presumed that, in a 48th stage (FF_48) to a 43rd stage (FF_43) of the FF group 221, type identifiers are stored in order from C, N, P, N, P to C ("non" between FF_01 and FF_42).

Here, it is presumed that, by arbitration in the arbitration circuit 24, a packet corresponding to the type identifier "P" of FF_46 is read out from the reception buffer 11. Subsequently, in the write/read control unit 223, the packet read-out start signal (Rd_Start) from the reception buffer read-out control circuit 25 and the clear-line position of FF_46 (P46 line) are input. Subsequently, as illustrated in FIG. 5, by shifting the holding content "N," "P" and "C" of FF_45 to FF_43 and the holding content "non" of FF_42 to FF_01 to stages on the head side in response to the packet read-out start signal and the clear-line position, the write/read control unit 223 deletes "P" held in FF_46. Also, "non" is stored in FF_01 of the tail end. By this means, a state is maintained where a packet of the latest arrival time may be always examined from the head stage (i.e. 48th stage).

Also, as illustrated in the above operation of the write/read control unit 223, in a case where a type identifier clearing operation with respect to the FF group 221 and the type identifier writing with respect to the FF group 221 are performed at the same time, the write/read control unit 223 performs a shift operation with respect to the FF group 221 in advance, deletes a clearing identifier of a packet read from a reception buffer, and, after that, stores a clearing identifier to be newly written in the FF group 221, in an FF in a writing position corresponding to "the position before the clearing operation+1."

According to Embodiment 1, the type identifier in each packet stored in the reception buffer group 10 is stored in a physical stage position of the FF group 22 held by the order buffer 22, in order of arrival of packets. That is, the order buffer 221 stores an identifier sequence in which type identifiers corresponding to identifiers in packet sort units are arranged in order of arrival of packets.

Subsequently, by detecting the head position of the identifier (i.e. type identifier P, N or C) of each packet in the identification sequence by the head position detection circuit 23, the arbitration circuit 24 can recognize the arrival order of packets P, N and C and, taking into account a forward ordering rule or a BUSY state of the transmission destination, determine a packet to be read out next.

Figure 9:
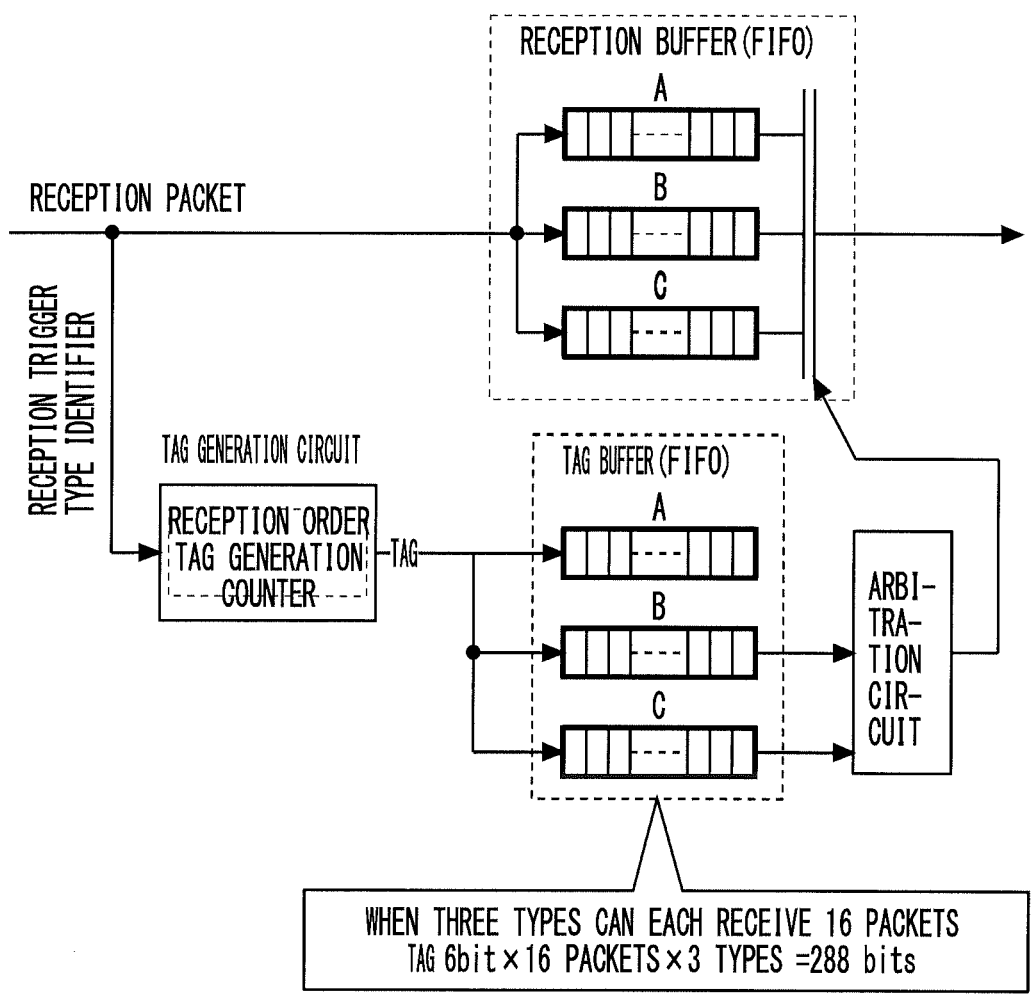
FIG. 9 is a diagram for explaining a conventional technique.

Here, the capacity in the FF group 221 of the order buffer 22 is 2 bits (corresponding to the bit number of a type identifier)×16 (corresponding to the maximum packet storage number of each reception buffer)×3 (corresponding to the reception buffer number)=96 [bit]. Therefore, it is possible to largely reduce a capacity compared to FIG. 9. By this means, it is possible to reduce the circuit amount to store arrival order information. Thus, according to the Embodiment 1, it is possible to reduce the capacity to record arrival order information of data blocks.

<Embodiment 2>

Next, Embodiment 2 will be explained. Since Embodiment 2 provides the same configuration as that of the packet read-out apparatus 1 explained in Embodiment 1, although differences will be mainly explained, the same reference numerals will be assigned to common points and their explanation will be omitted.

In a case where a sort unit (corresponding to the number of packet types in the example of Embodiment 1) is 2 raised to the n-th power (n=1, 2, 3, . . . ) (i.e. 2, 4, 8, 16, . . . ), if an unassigned identifier "non" is included as described in Embodiment 1, the identifier bit number has to be set to "sort unit number+1 bit." Therefore, an embodiment in which packet read-out instruction control similar to that in Embodiment 1 is possible without using "non" indicating unassignment, will be explained as Embodiment 2.

Figure 6:
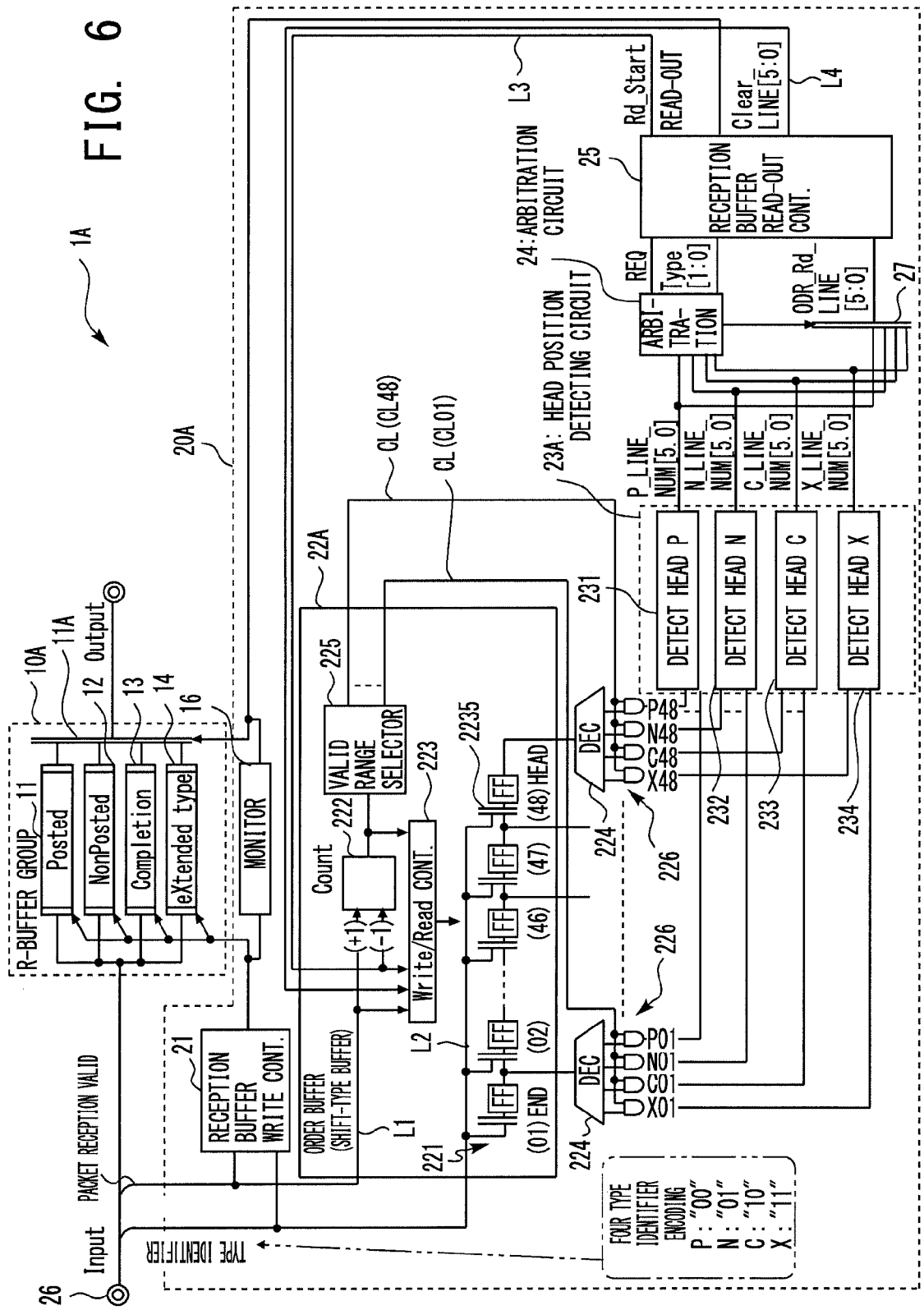
FIG. 6 is a diagram illustrating a configuration example of a data block read-out control apparatus in Embodiment 2.

FIG. 6 illustrates a configuration example of a data block read-out apparatus (i.e. packet read-out apparatus 1A) according to Embodiment 2. The packet read-out apparatus 1A has a reception buffer group 10A and packet read-out control apparatus 20A corresponding to the reception buffer group 10 and the packet read-out control apparatus 20 in the packet read-out apparatus 1 explained in Embodiment 1.

Embodiment 2 differs from Embodiment 1 in the following points. That is, although the number of packet types is three of "P," "N" and "C" in Embodiment 1, a packet type "X (eXtended Type)" is added and therefore there are four types of packet types in Embodiment 2.

Therefore, the reception buffer group 10A further includes a reception buffer 14 to hold a packet of the type "X" (hereinafter referred to as "X packet"), in addition to the reception buffers 11 to 13 to hold the P packet, the N packet and the C packet. Each of the reception buffers 11 to 14 accumulates maximum 12 packets.

The reception unit 26 in Embodiment 2 encodes an identifier included in an arrival packet, into a two-bit type identifier. At this time, the types "P," "N," "C" and "X" are encoded into 2 bits of "00," "01", "10" and "11," respectively.

The encoded type identifier and a packet reception valid signal are input in the reception buffer write control circuit 21 in the same way as in Embodiment 1. According to the type identifier, the reception buffer write control circuit 21 causes one of the reception buffers 11 to 14 to hold the packet transmitted from the reception unit 26. It should be noted that it is similar to Embodiment 1 in that the type identifier and the packet reception valid signal are input in an order buffer 22A corresponding to the order buffer 22 in Embodiment 1 via the signal lines L1 and L2.

The order buffer 22A differs from the order buffer 22 of Embodiment 1 in the following points. First, a generation source of the unassigned identifier "non" is omitted and it is designed such that "non" is not input in FF_01 at the tail end of the FF group 221. That is, in a case where a write enable signal for a type identifier with respect to FF_01 is issued from the write/read control unit 223, a type identifier flown in the signal line L2 is written in FF_01. The write/read control unit 223 has substantially the same configuration (FIG. 2) as in Embodiment 1.

Also, unlike Embodiment 1, each decoder connected to the output terminal of each of FF_48 to FF_01 has four output terminals supporting the type identifiers "P," "N," "C" and "X." The four output terminals are connected to one-side input terminals of four AND circuits (i.e. AND circuit group 226) provided after the decoder 224.

The decoder 224 decodes a type identifier held in a corresponding FF. According to the decode result, the decoder 224 outputs an ON signal only to an output terminal corresponding to the type identifier held by the FF and outputs an OFF signal to the other output terminal.

By this means, the AND circuit group 226 is formed with: an AND circuit (which will be expressed as "AND circuit 226_1") in which an ON signal is input in a case where the decode result is "P"; an AND circuit (which will be expressed as "AND circuit 226_2") in which an ON signal is input in a case where the decode result is "N"; an AND circuit (which will be expressed as "AND circuit 226_3") in which an ON signal is input in a case where the decode result is "C"; an AND circuit (which will be expressed as "AND circuit 226_4") in which an ON signal is input in a case where the decode result is "X."

In the order buffer 22A, an available range selector 225 in which a counter value of the counter 222 is input, is added (the available range selector 225 will be described later in detail). An output terminal of the available range selector 225 is connected to the other output terminal of each of the AND circuit group 226_1 to 226_4 provided after each decoder.

The output terminals of the AND circuits 226_1 to 226_3 in the AND circuit group 226 are connected to the head P position detection circuit 231, the head N position detection circuit 232 and the head C position detection circuit 233 in the head position detection circuit 23A via the P line, the N line and the C line explained in Embodiment 1, respectively.

Also, the output terminal of each AND circuit 226_4 is connected to the head X position detection circuit 234 provided in the head position detection circuit 23A via the signal line. A plurality of signal lines connecting between the head X position detection circuit 234 and the AND circuits 226_4 function as X lines (X48 to X01 lines) to communicate the decode result "X" in each decoder 224 to the head X position detection circuit 234.

The head X position detection circuit 234 denotes a circuit to detect the head storage position of the type identifier "X" in the FF group 221 and has substantially the same configuration as that of the head P position detection circuit 231 illustrated in FIG. 3. That is, although it is not illustrated, it includes a plurality of AND circuit groups and signal detection circuits similar to the plurality of AND circuits 2311 and signal detection circuits 2312 held in the head P position detection circuit 231 illustrated in FIG. 3, and the connection states between the AND circuit groups, the signal detection circuits and the X48 to X01 lines are similar to those in the head P position detection circuit. Therefore, the signal detection circuit (not illustrated) in the head X position detection circuit 234 can output an X_LINE_NUM signal indicating the headmost FF stage number holding the type identifier "X" in the FF group 221. The X_LINE_NUM signal is input in the arbitration circuit 24 and the selector 27 in the same way as the P_LINE_NUM signal, the N_LINE_NUM signal and the C_LINE_NUM signal.

The arbitration circuit 24 determines a reception buffer for which packet reading is performed, in the same way as in Embodiment 1, that is, according to a forward ordering rule. For example, according to a forward ordering rule with the priority order from P, C, N to X, the arbitration circuit 24 can determine a reception buffer for which packet reading has to be performed, and output a control signal with respect to the selector 27.

The available range selector 225 defines an available range of the FF group 221. That is, the available range selector 225 has a plurality of (in the example of Embodiment 2, 48 items of) control lines CL (CL48 to CL01) connected to the AND circuits 2261 to 226_4 of each AND circuit group 226. The available range selector 225 outputs an ON signal to an output line based on the counter value input from the counter 222 and outputs an OFF signal to the remaining output lines.

Here, when it is presumed that the initial value of the counter value is "00," an ON signal is output only to CL48 in a case where the counter value is "01" (i.e. in a case where only FF_48 holds a type identifier). When the counter value is "02" (i.e. when FF_48 and FF_47 hold type identifiers), an ON signal is output to CL48 and CL47. Thus, the available range selector 225 outputs an ON signal only to the control line CL corresponding to an FF holding a type identifier, which is found by a counter value, and causes the remaining control lines CL to be "OFF."

Therefore, the control line CL corresponding to an FF not holding a type identifier is "OFF," and therefore an output of the AND circuit group 226 in which the control line CL is "OFF," is "OFF." Therefore, only from the AND circuit group 226 in which the control line CL is "ON" (i.e. which corresponds to an FF holding a type identifier), an ON signal from the decoder 224 is input in the head position detection circuit 23A.

Except for the above explanation, the configurations and operations in Embodiment 2 are similar to those in Embodiment 1, and therefore their explanation will be omitted.

According to the packet read-out apparatus 1A of Embodiment 2, it is possible to perform packet read-out control similar to that of the packet read-out apparatus 1 explained in Embodiment 1, without including "non" in identifiers stored in the order buffer 22A. By this means, in a case where the sort unit number (in the example of Embodiment 2, the packet type number) is 4, it is possible to set an identifier of 2-bit width. Also, in a case where the sort unit number (i.e. packet unit number) is 2, it is possible to set an identifier of 1-bit width (i.e. 0 or 1). That is, it is possible to set an identifier bit width to a minimal bit width with respect to a sort unit number.

It should be noted that, in the configuration example of Embodiment 2, in a case where the sort unit (i.e. packet type number) is 2, the encode result is set to "0" or "1" according to a packet type in encode processing in the reception unit 26, and it is set such that packets are sorted and stored in two reception buffers in the reception buffer group 10A according to a type identifier ("0" or "1") in the reception buffer write control circuit 21. Further, a setting is applied to perform operations such that, according to whether the decode result of the holding content of an FF is "0" or the decode result is "1," each decoder 224 outputs an ON signal only to a corresponding output line and the remaining output lines are "OFF."

The configuration of Embodiment 2 is applicable to a case where the sort unit number is 2 raised to the n-th power different from 2 or 4 as described above.

<Embodiment 3>

Next, Embodiment 3 will be explained. Since Embodiment 3 provides the same configuration as that of the packet read-out apparatus 1 explained in Embodiment 1, although differences will be mainly explained, the same reference numerals will be assigned to common points and their explanation will be omitted.

Figure 7:
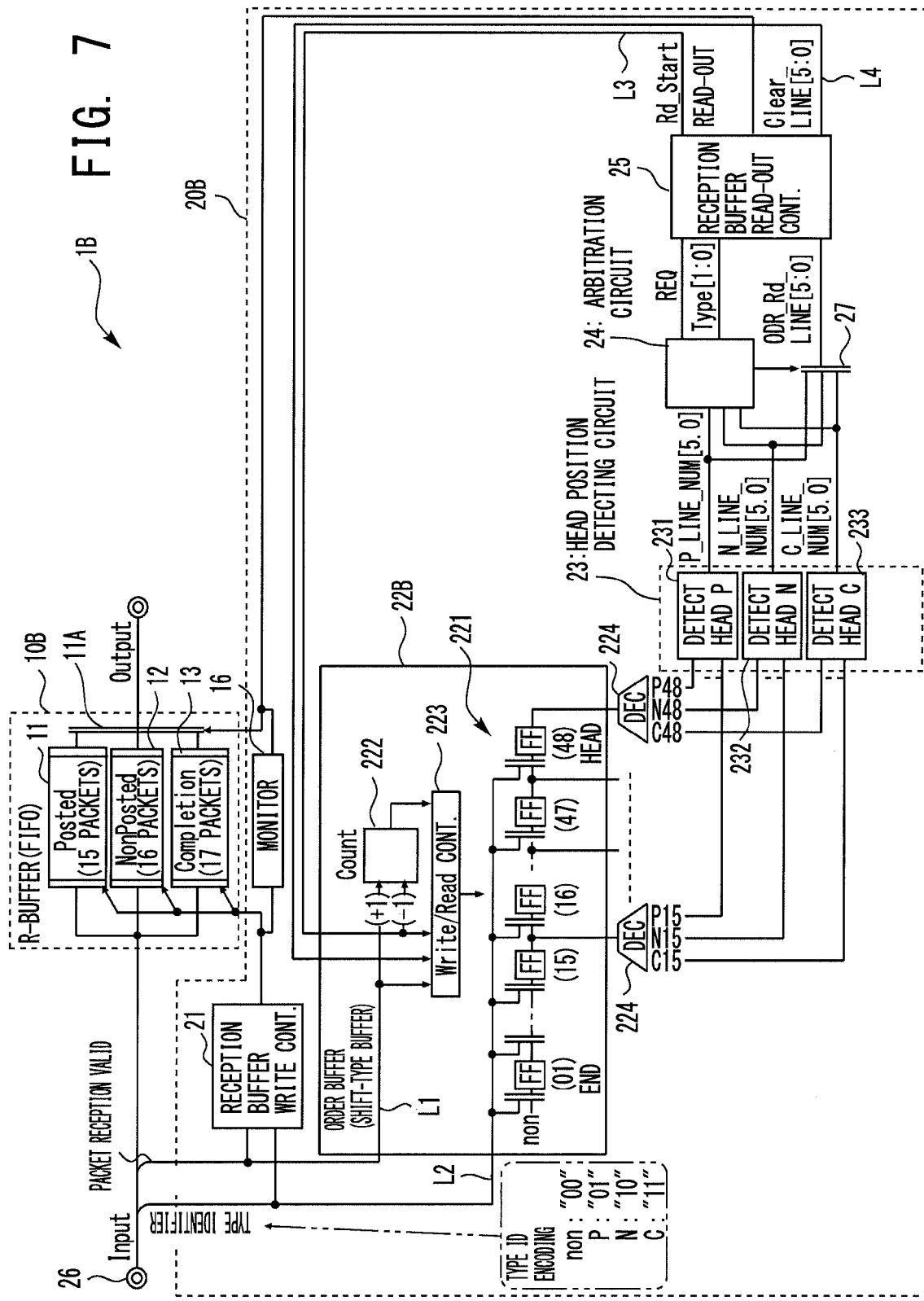
FIG. 7 is a diagram illustrating a configuration example of a data block read-out control apparatus in Embodiment 3.

In Embodiment 3, another method to detect the head position per packet type will be explained using the packet read-out control circuit 20 of Embodiment 1 as a basic configuration. In Embodiment 1, the decoder 224 is provided in all FFs forming the FF group 221 to examine the packet type held in each FF. In Embodiment 3, a method for reducing the number of decoders 224 provided in the FF group 221 will be explained. FIG. 7 is a diagram illustrating a configuration example of a data block read-out apparatus (i.e. packet read-out apparatus 1B) according to Embodiment 3. In FIG. 7, a reception buffer group 10B includes the reception buffers 11, 12 and 13 holding the P packet, the N packet and the C packet explained in Embodiment 1. Here, although the total number of packets storable in the reception buffer group 10B in Embodiment 3 is equal to that of Embodiment 1 (i.e. 48), the maximum storage number in each of the reception buffers 11 to 13 differs from that of Embodiment 1.

In the example of Embodiment 3, the maximum storage number of the reception buffer 11 is 15, the maximum storage number of the reception buffer 12 is 16 and the maximum storage number of the reception buffer 13 is 17, and each of the reception buffers 11 to 13 can store fixed-length or variable-length packets up to the maximum storage number.

Also, in the packet read-out apparatus 1E, the decoder 224 provided on the output side of the FF group 221 is provided only in an FF on a stage belonging to an examination range determined according to an examination range determination method (described later).

Figure 8:
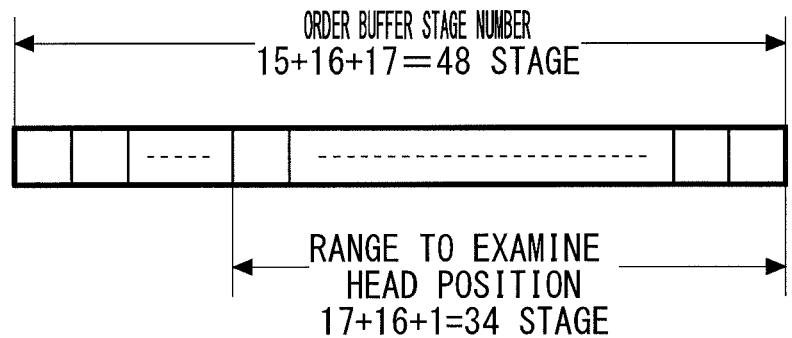
FIG. 8 is a diagram for explaining a method of determining an examination range of the head position of each packet type in Embodiment 3.

In Embodiment 3, in the following examination range determination method, the number of FF stages in which the decoder 224 is provided, is limited. In the examination range determination, when the packet type number (i.e. sort unit number) is "n" and the maximum storage number of each reception buffer corresponding to each packet type is S1, . . . , Sn (where "n" is an integer greater than 0), the maximum storage number of a reception buffer having the lowest maximum storage number is regarded as "1." The number acquired by adding the sum of the maximum storage numbers of the remaining reception buffers to this maximum storage number "1" is calculated. Subsequently, the calculated number is used as the stage number of an examination range to examine the head position of each packet type, and the decoder 224 is provided on the output side of each FF belonging to the stage numbers of the examination range from the head (i.e. FF_48) of the FF group 221. FIG. 8 illustrates a method for determining an examination range of the FF group 221 in Embodiment 3. In the example of Embodiment 3, as described above, the maximum packet storage numbers of the reception buffers 11, 12 and 13 are 15, 16 and 17, respectively, and the total number of packets storable in the reception buffer group 10B is the sum of the maximum storage numbers of the reception buffers 11 to 13, that is, 48 (15+16+17=48). Therefore, the number of FFs (i.e. number of order buffer stages) that should be held by the FF group 221 is 48 [stages], which is equal to the total number of packets storable in the reception buffer group 10B.

By contrast with this, the number of stages in a range (i.e. examination range) to examine the head position of each packet type is determined as follows. That is, the lowest maximum storage number among the maximum storage numbers of the reception buffers 11 to 13 is 15 [items] of the maximum storage number of the reception buffer 11. The sum value of the maximum storage numbers of all of the reception buffers 11 to 13 is calculated in a case where this maximum storage number "15" is regarded as "1." That is, the maximum storage number of the reception buffer 11 regarded as "1" and the maximum storage numbers "16" and "17" of the remaining reception buffers 12 and 13 are added and the addition result "34" is acquired. This addition result "34" is determined as the stage number in the examination range. The reason is as follows.

If type identifiers (total number: 33) corresponding to 17 C packets and 16 N packets are stored in the FF group 221, it means that stages from the head stage (FF_48) to the 33rd stage (FF_16) are used. In this case, the packet transmission side refrains from transmitting the C packet and the N packet. By this means, a packet that is receivable next is necessarily the P packet. Therefore, between the head stage (FF_48) and the 34th stage (FF_15), the identifier "P" of the P packet received is necessarily stored in the head.

Therefore, by examining the holding content between FF_48 and FF_15, it is possible to detect the head positions of all of the type identifiers P, N and C. Therefore, in Embodiment 3, as illustrated in FIG. 7, the decoder 224 is provided only on the output sides of FF_48 to FF_15 corresponding to the examination range (i.e. from the head to the 34th stage).

In this examination range determination method, in a case where the maximum receivable number of each reception buffer is two or more and the maximum receivable numbers of all reception buffers are equal, the number of stage (i.e. examination range) requiring an examination is minimum.

For example, as in Embodiment 1, in a case where the maximum storage numbers of all the reception buffers 11 to 13 are each 16 [items], the sum value of the maximum storage numbers of all the reception buffers is calculated in a case where the maximum storage number of one of the reception buffers is regarded as "1." Subsequently, the result is 1+16+16=33, which is a smaller examination range than the example of Embodiment 3.

According to Embodiment 3, the decoder 224 to decode the holding content of an FF is provided only in FF_48 to FF_15 belonging to the examination range. By this means, it is possible to reduce the number of decoders 224 and the number of lines between each decoder 224 and the head position detection circuit 23. Therefore, it is possible to reduce the circuit amount of the packet read-out control apparatus.

The configurations indicated in Embodiments 1 to 3 can be adequately combined. Also, the configurations explained in Embodiments 1 to 3 are applicable to the packet read-out apparatus (i.e. data block read-out apparatus) taking into account the packet (i.e. data block) arrival order and the preference order between reception buffers, regarding the reading of packets (i.e. data blocks) from a plurality of reception buffers.

Although examples have been described in Embodiments 1 to 3 where a data block is a packet, the data block form is not limited to "packet," and various data block units called "frame," "data gram," "cell," "file" and "page" are possible as long as an identifier applicable as a sort unit is assigned thereto.

Also, although examples have been described in Embodiment 1 to 3 where a sort unit is a packet type, it is possible to apply various units (i.e. attribution classes) as the sort unit related to data blocks. Also, the sort unit may be an identifier indicating the transfer destination of data blocks of the same type. For example, the sort unit may be an identifier (i.e. channel class) of the data block transfer destination. In this case, a channel may be an actual channel or a virtual channel. Alternatively, the sort unit may be an address indicating the data block destination.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data block read-out control apparatus, comprising:
    an order buffer that stores an identifier sequence in which sort-unit identifiers corresponding to a plurality of data blocks stored in a plurality of reception buffers prepared for each sort unit are arranged in arrival order of the plurality of data blocks;
    a detecting unit that detects a head position of each of the sort-unit identifiers in the identifier sequence;
    a determining unit that determines a data block to be read out from one of the plurality of reception buffers, based on at least the head position of each of the sort-unit identifiers and a read-out rule of data blocks from the plurality of reception buffers defined in advance; and
    a reading-out unit that reads out the data block determined in the determining unit, from the one of the plurality of reception buffers,
    wherein the sort-unit identifiers are expressed by a minimum bit number to express all sort units corresponding to the data blocks stored in the plurality of reception buffers.

2. The data block read-out control apparatus according to claim 1, wherein:
    the order buffer includes a plurality of storage areas configured to store each of the plurality of sort-unit identifiers forming the identifier sequence;
    the number of the plurality of storage areas is equal to or greater than a maximum number of data blocks stored in the plurality of reception buffers; and
    the detecting unit detects the head positions of each of the sort-unit identifiers in the identifier sequence by examining holding content of the plurality of storage areas.

3. The data block read-out control apparatus according to claim 2, further comprising a write/read control unit that performs control for the sort-unit identifiers corresponding to the plurality of data blocks held in the plurality of reception buffers being stored in the plurality of storage areas in a forward aligned manner,
    wherein the detecting unit detects head positions of each of the sort-unit identifiers in the identifier sequence by examining holding content of the plurality of storage areas in order from a head side of the order buffer.

4. The data block read-out control apparatus according to claim 3, wherein:
    all of the sort units are assigned to all values which a minimum bit number is available when a number of the sort units is a value when two is raised to n-th power (n=1, 2, 3, . . .);
    one of values which the minimum bit number is available is used as an identifier indicating unassignment of the sort units when the number of sort units is a value that one less than a value when two is raised to the n-th power; and
    the write/read control unit performs storage control of the sort-unit identifiers with respect to the plurality of storage areas such that the sort-unit identifiers are stored in the plurality of storage areas in a forward aligned manner and each of the plurality of storage areas, in which the sort-unit identifiers are not stored, is filled with the identifier indicating unassignment of the sort units.

5. The data block read-out control apparatus according to claim 2, wherein, when a maximum storage number of the data blocks is different between the plurality of reception buffers, the detecting unit detects each of the head positions of the sort-unit identifiers in the identifier sequence by examining storage content of storage areas, which are consecutive from a head storage area, corresponding to a sum value of maximum storage numbers of all of the reception buffers when a maximum storage number of one of the plurality of reception buffers having a smallest maximum storage number of data blocks is regarded as one.

6. The data block read-out control apparatus according to claim 2, wherein, when a maximum storage number of the data blocks is equal to between the plurality of reception buffers, the detecting unit detects each of the head positions of the sort-unit identifiers in the identifier sequence by examining storage content of storage areas, which are consecutive from a head storage area, corresponding to a sum value of maximum storage numbers of all of the reception buffers when a maximum storage number of the data blocks of any one of the plurality of reception buffers is regarded as one.

7. The data block read-out control apparatus according to claim 1, wherein:
    each of the plurality of data blocks has one of a plurality of types differing from each other;
    each of the plurality of reception buffers corresponds to any one of the plurality of types and stores data blocks each having a corresponding type; and
    the sort-unit identifiers are identifiers of the types.

8. The data block read-out control apparatus according to claim 1, wherein:
    each of the plurality of data blocks has one of a plurality of types differing from each other; and
    the sort-unit identifies are obtained by cording the plurality of types.

9. The data block read-out control apparatus according to claim 1, wherein the sort-unit identifiers are expressed by the number of bits which is fewer than the number of bits to express the maximum number of data blocks stored in the plurality of reception buffers and can express all patterns of the sort-unit identifiers.

10. A data block read-out control method, comprising:
   storing, in an order buffer, an identifier sequence in which sort-unit identifiers corresponding to a plurality of data blocks stored in a plurality of reception buffers prepared for each sort unit are arranged in arrival order of the plurality of data blocks;
   detecting a head position of each of the sort-unit identifiers in the identifier sequence;
   determining a data block to be read out from one of the plurality of reception buffers, based on at least each of the head positions of the sort-unit identifiers and a read-out rule of data blocks from the plurality of reception buffers defined in advance; and
   reading out the determined packet from the one of the plurality of reception buffers,
   wherein the sort-unit identifiers are expressed by a minimum bit number to express all of types of the data blocks stored in the plurality of reception buffers.

11. The data block read-out control method according to claim 10, wherein:
   each of the plurality of data blocks has one of a plurality of types differing from each other;
   each of the plurality of reception buffers corresponds to any one of the plurality of types and stores data blocks each having a corresponding type; and
   the sort-unit identifiers are identifiers of the types.

12. The data block read-out control method according to claim 10, wherein:
   each of the plurality of data blocks has one of a plurality of types differing from each other; and
   the sort-unit identifiers and obtained by cording the plurality of types.

13. The data block read-out control method according to claim 10, wherein the sort-unit identifiers are expressed by the number of bits which is fewer than the number of bits to express the maximum number of data blocks stored in the plurality of reception buffers and can express all patterns of the sort-unit identifiers.

* * * * *